United States Patent [19]

Suzuki

[11] Patent Number: 4,809,800
[45] Date of Patent: Mar. 7, 1989

[54] EXHAUST SYSTEM FOR VEHICLE
[75] Inventor: Toshiyuki Suzuki, Shimada, Japan
[73] Assignee: Yamaha Hatsudoki Kabushiki Kaisha, Iwata, Japan
[21] Appl. No.: 65,641
[22] Filed: Jun. 19, 1987

Related U.S. Application Data

[63] Continuation of Ser. No. 807,291, Dec. 10, 1985, abandoned.

[30] Foreign Application Priority Data

Dec. 10, 1984 [JP] Japan ............................. 59-259358
Dec. 18, 1984 [JP] Japan ............................. 59-265259

[51] Int. Cl.$^4$ ............................................. F01N 7/08
[52] U.S. Cl. ................................. 180/219; 60/312; 180/309; 181/239
[58] Field of Search ........... 180/225, 219, 296, 309, 180/89.2; 181/238, 239, 240; 60/312

[56] References Cited

U.S. PATENT DOCUMENTS 3,949,829  4/1976  Honda et al. .................... 180/225
4,359,865 11/1982  Nakao ............................. 180/219
4,469,189  9/1984  Minami et al. ................... 180/219
4,487,288 12/1984  Watanabe ......................... 181/238

FOREIGN PATENT DOCUMENTS 0206717 12/1982 Japan ................................. 60/312
0049518  3/1983 Japan ............................... 180/219
0074325  4/1984 Japan ................................. 60/312

Primary Examiner—David M. Mitchell
Attorney, Agent, or Firm—Ernest A. Beutler

[57] ABSTRACT

A motorcycle embodying an improved exhaust device comprised of an expansion chamber that extends in part beneath the engine and transmission and which extends at least partially vertically upwardly adjacent to the transmission. A U-shaped inlet pipe delivers exhaust gases from the engine to the expansion chamber and a further expansion chamber is provided for discharging the exhaust gases to the atmosphere. Stainless steel, single thickness exhaust pipes deliver the exhaust gases from the engine exhaust ports to the expansion chamber.

3 Claims, 3 Drawing Sheets

EXHAUST SYSTEM FOR VEHICLE

This is a continuation of U.S. patent application Ser. No. 807,291, filed Dec. 10, 1985, now abandoned.

BACKGROUND OF THE INVENTION

This invention relates to an exhaust system for a vehicle and more particularly to an improved compact, high efficiency exhaust system for vehicles that are designed primarily for operation by a single rider.

Many vehicles powered by internal combustion engines are designed to be operated primarily by a single rider. Powered vehicles normally embody at least one dirigible front wheel, a rear wheel, a frame that is adapted to provide a support for a rider and/or passengers and which supports a power plant, normally an internal combustion engine, for powering at least one of the vehicle wheels. If the vehicle is designed to be operated by, and normally accommodate only, a single rider, the vehicle has a very compact configuration. As such, it is very difficult to provide an effective silencing arrangement for the exhaust of the internal combustion engine. Motorcycles are typical examples of vehicles of the type which provide difficulty in accomplishing efficient silencing in the very small area available to provide all of the necessary components and also an efficient silencing system. One of the most effective silencing devices for internal combustion engines is the use of an expansion chamber in the exhaust system. When the vehicle is extremely compact, as in the case of single rider vehicles such as motorcycles, it is difficult to provide an expansion chamber of sufficient volume within the available area and still permit a compact and yet serviceable arrangement.

Most exhaust systems for vehicles of this type embody one or more exhaust pipes that extend from the exhaust ports of the engine and which terminate in an exhaust device such as a muffler or the like which includes an expansion chamber. If the expansion chamber is to have sufficient volume and the vehicle is as compact as desired, it is extremely difficult to appropriately position the exhaust expansion chamber so that it will not interfere with the other components of the vehicle, so that it will have sufficient volume, and so that it can be positioned so that it will not interfere with the rider of the vehicle. Most, if not all, motorcycles or other vehicles of this type, therefore, position an expansion chamber to the rear of the engine. As a result, it is necessary to increase the wheel base of the vehicle so as to accommodate the expansion chamber. Alternatively, the expansion chamber must be positioned rearwardly of the engine and, therefore, the overall width of the vehicle is undesirably increased and, furthermore, the exhaust system is lengthened consideration.

It is, therefore, a principal object of this invention to provide an exhaust system for a vehicle that permits the use of a large volume expansion chamber and yet which permits a compact configuration.

It is another object of this invention to provide an exhaust system for a vehicle that permits the use of a large expansion chamber and which does not increase the length of the vehicle and/or the exhaust system.

It is a still further object of this invention to provide an improved exhaust system for a vehicle which permits a relatively large and yet forwardly position exhaust system.

In a vehicle such a motorcycle or other types of off the road vehicles which offer a compact configuration and which are designed to accommodate only a single rider, it is very difficult to provide an enlarged expansion chamber within the confines the main frame of the vehicle and between the front and rear vehicle wheels. As a result, it has been proposed to provide exhaust systems for vehicles that employ expansion chambers that are located in areas which are difficult to service and/or necessitate elongation of the vehicle.

It is, therefore, still a further object of this invention to provide an exhaust system for a vehicle embodying an expansion chamber that can be conveniently positioned between the front and rear wheels and which will still have a large volume.

In connection with certain vehicles such as motorcycles or the like wherein some of the exhaust system is exposed externally, it has been the practice to provide a double exhaust pipe leading to the exhaust chamber so as to insure that the exhaust pipe will not become discolored in use. That is, in a conventional type of exhaust system for this type of vehicle, it has been prpposed to provide a heat resistant interior pipe and an exterior pipe that is insulated from the interior pipe and which is constructed in such a way that it will not become discolored from the heat of the exhaust gases. Of course, the use of such double pipe systems raises a numer of problems in designing, forming and assembling the exhaust system.

It is, therefore, still a further object of this invention to provide an exhaust system for a vehicle in which the exhaust pipe is exposed and yet will not become discolored due to the heat and use of the system.

SUMMARY OF THE INVENTION

A first feature of this invention is adapted to be embodied in an exhaust system for a vehicle having a frame means, at least one front wheel dirigibly supported by the frame means, at least one rear wheel journaled by the frame means, an engine supported by the frame means and positioned at least in part between the front and rear wheels and transmission means for driving at least one of the wheels from the engine. In accordance with this feature of the invention, an exhaust pipe extends from the engine rearwardly of the frame means and cooperates with an exhaust device. The exhaust device defines an expansion chamber and an inlet is provided to the expansion chamber which communicates at an inlet end forwardly of the expansion chamber with the exhaust pipe and which extends rearwardly within the expansion chamber and which terminates in a forwardly extending outlet opening forwardly into the expansion chamber. An outlet extends from the expansion chamber to the atmosphere.

Another feature of the invention is adapted to be embodied in a vehicle of the type as aforedescribed that includes a frame, a front wheel dirigibly supported by the frame, a rear wheel, an engine and a transmission that drives one of the wheels from the engine. In accordance with this feature of the invention, the rear wheel is the driven wheel and the transmission is position rearwardly of the engine and forwardly of the rear wheel. An expansion chamber is provided in the exhaust system that includes a portion that extends in a generally horizontal direction and further includes a vertically extending portion that is disposed between the engine and the rear wheel.

In accordance with another feature of the invention, the vehicle includes the frame means, the front wheel, the rear wheel, the engine and the transmission for driving one of the wheels. In addition, there is provided an exhaust device and a stainless steel exhaust pipe extends from the engine to the exhaust device and the stainless steel exhaust pipe has only a single wall thickness.

DETAILED DESCRIPTION OF THE PREFERRED EMBODIMENT

Figure 1:
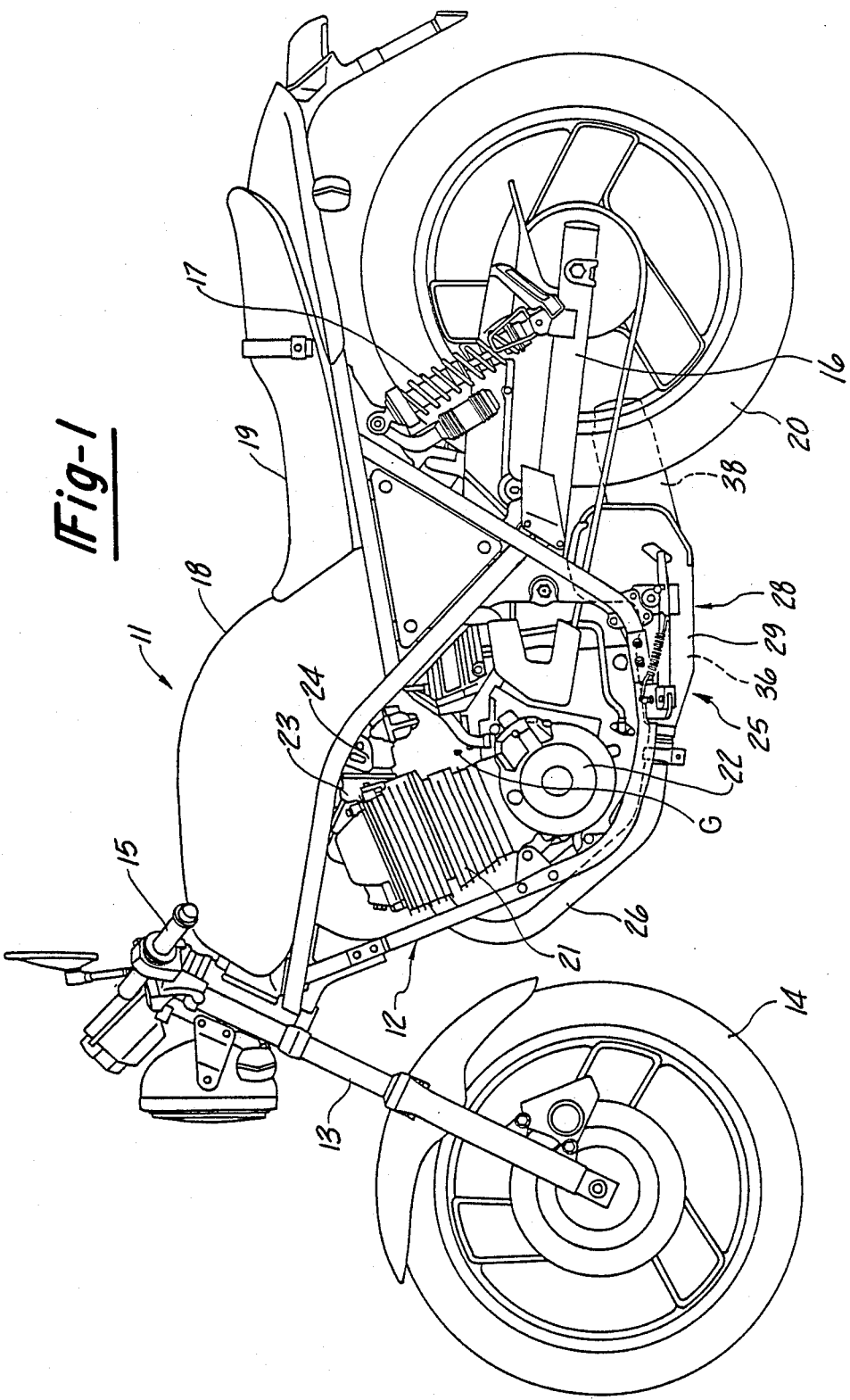
FIG. 1 is a side elevational view of a motorcycle having an exhaust system constructed in accordance with an embodiment of the invention.
Figure 2:
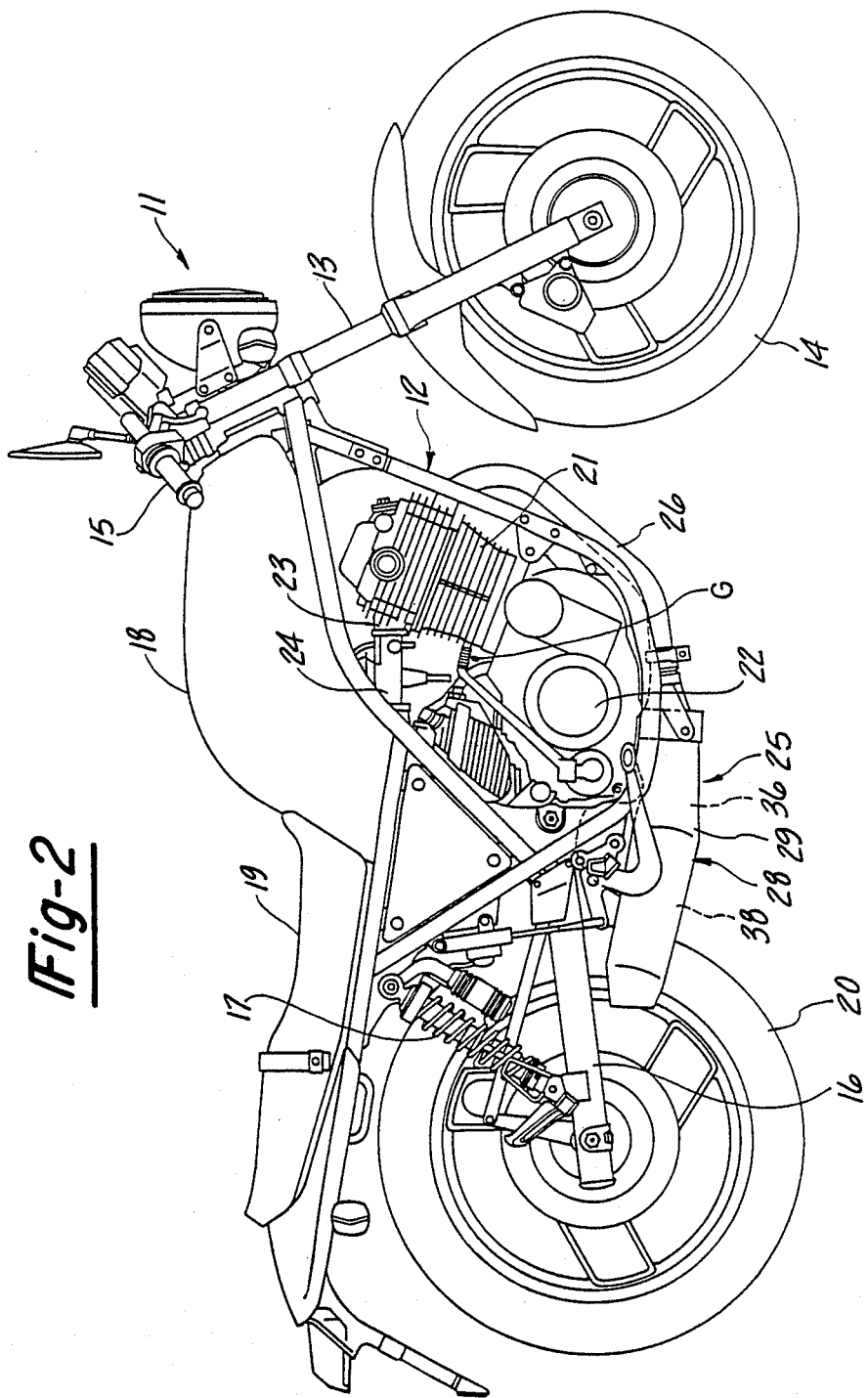
FIG. 2 is a side elevational view of the motorcycle looking from the opposite side.

Referring now in detail to the drawings, a vehicle constructed in accordance with an embodiment of the invention is identified generally by the reference numeral 11. In the illustrated embodiment, the vehicle 11 is a motorcycle. It is to be understood, however, that the invention may be utilized in conjunction with any type of vehicle but has particularly utility with a vehicle of the type that is designed to be operated primarily by a single rider.

The vehicle 11 is comprised of a frame assembly 12 which, in the illustrated embodiment, is of the welded tubular construction and which supports a front fork assembly 13 that dirigibly supports a front wheel 14 that may be steered by means of a handlebar assembly 15. In addition, the frame assembly 12 supports on driven rear wheel 20 by means of a trailing arm assembly 16 that is pivotally supported by the frame assembly 12 and which is supported for suspension movement by means of a suspension element or elements comprised of a tubular shock absorber and surrounding coil spring, indicated by the reference numeral 17.

A fuel tank 18 is supported by the frame assembly 12 rearwardly of the front fork 13 and forwardly of a seat 19 that is designed to be occupied by the single rider. As is well known in this art, a passenger may be seated on the seat 19 or an extension of it rearwardly of the rider.

The frame assembly 12 is of the double cradle type and is designed to support an internal combustion engine, indicated generally by the reference numeral 21 which may be of any known type and which, in the illustrated embodiment, is of the two cylinder inline type. The engine 21 has its output shaft supported for rotation about an axis that extends transversely to the longitudinal axis of the motorcycle 11 and which drives the rear wheel 20 through a suitable combined crankcase change speed transmission assembly 22 and final drive, which may be of any known type.

The engine 21 is of the overhead crankshaft or overhead valve type and has an intake system that is comprised of an induction manifold 23 that extends rearwardly and which cooperates with one or more carburetors 24 that receive a filtered air charge from an air cleaner assembly (not shown) in a known manner. The engine 21 and specifically its cylinder head has one or more forwardly facing exhaust ports that receive the exhaust gases from the engine 21 and discharge them to an exhaust system, indicated generally by the reference numeral 25 and which will now be described by particularly reference to FIGS. 3 and 4.

The engine exhaust ports each cooperate with exhaust pipes 26 that have inlet flanges 27 that are appropriately affixed to the engine exhaust ports so as to receive the exhaust gases from the respective ports and/or cylinders. Unlike the prior art type of constructions, the exhaust pipes 26 and the flanges 27 are formed integrally from single wall thickness pieces of stainless steel exhaust tubing. With prior art type of constructions, wherein the exhaust pipes 26 are exposed, it has been the practice to employ an inner pipe that is constructed of a material that is adapted to operate under the heat of the exhaust gases and a surrounding pipe which will be insulated from the inner pipe and which will not discolor in use. However, because the pipes 26 and flanges 27 are formed from stainless steel, particularly that of a high chrome and nickel content, it is unnecessary to use such a double pipe construction and discoloring will not occur.

Figure 3:
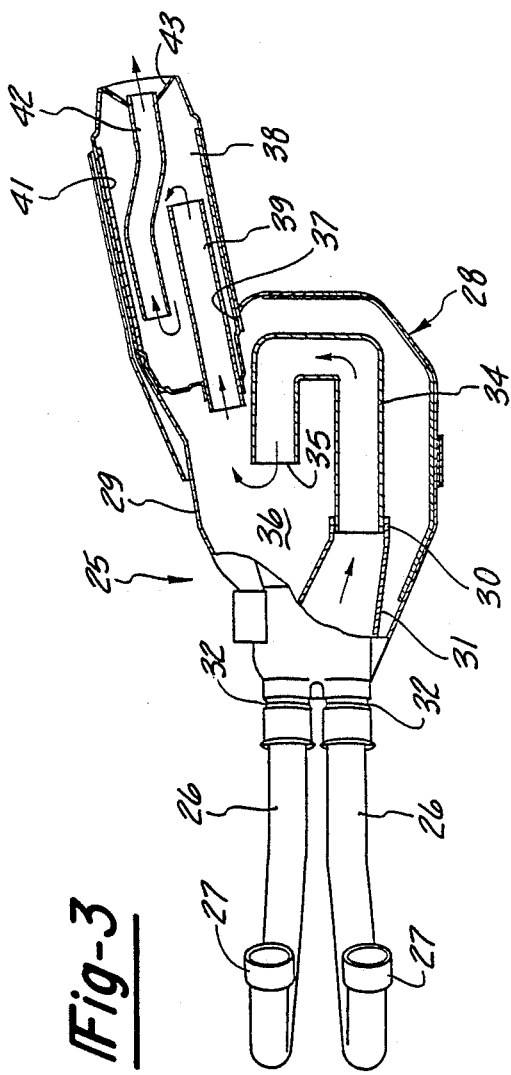
FIG. 3 is a top plan view, with portions broken away and shown in section, of the exhaust system for the vehicle.
Figure 4:
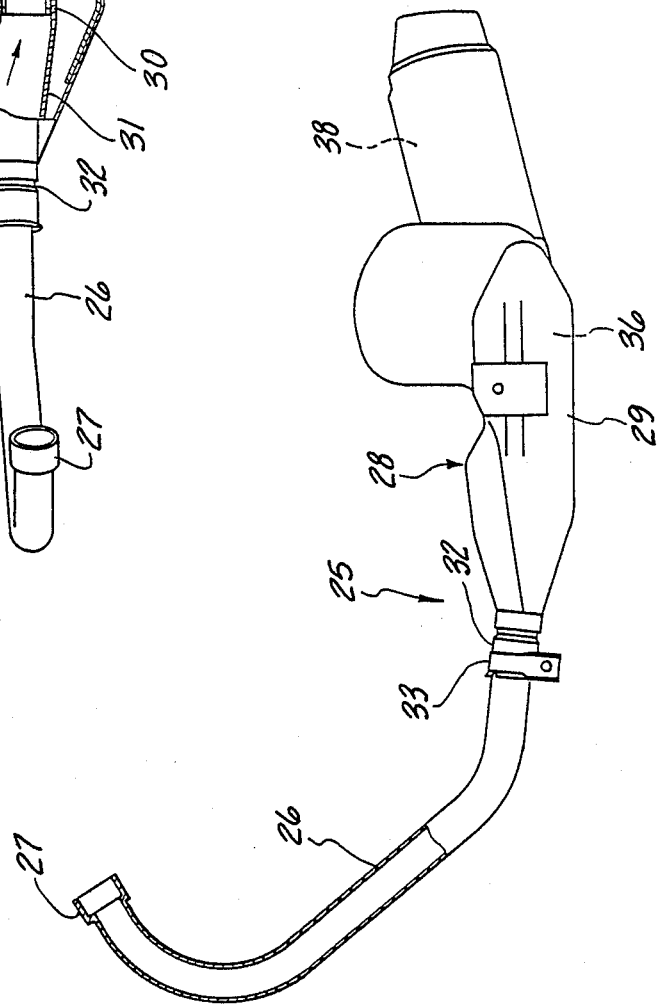
FIG. 4 is a side elevation view, with a portion broken away, of the exhaust system.

The exhaust pipes 26 each feed into an exhaust device, indicated generally by the reference numeral 28, and which is constructed so as to incorporate a number of the features of the invention which permit the effective silencing of the exhaust while maintaining a low center or gravity and, also, without encroaching on the area of the legs of the rider. The exhaust device 28 includes an outer shell 29 having an inlet collector section 31 that is comprised of a pair of inlet pipes 32 to which the outlet ends of the exhaust pipes 26 are connected by means of clamps or the like 33. The collector section 31 has an outlet end 30 that has a slip flange connection with a generally U-shaped inlet pipe 34. The inlet pipe 34 extends rearwardly from its inlet end defined by the aforementioned slip flange and then which has a re-entrant portion extending into an outlet opening 35 formed by a U-shaped section which terminates within an expansion chamber 36 formed within the outer shell 29. The expansion chamber 36 extends generally vertically upwardly on one side of the engine 21 and transmission assembly 22 and above the horizontally extending lower edge of the transmission section 22 as best shown in FIGS. 3 and 4. As a result of this configuration, the exhaust system and specifically the exhaust device 25 is position well below the center of gravity G of the engine transmission assembly so as to permit a compact assembly. In addition, the vertically upwardly extending portion of the expansion chamber 36 is positioned forwardly of the rear wheel 15 and in the area between the engine 21 ad the rear wheel 15 so as to provide an extremely compact assembly and yet still provide a very large expansion chamber.

It should be apparent that silencing within the device 28 is accomplished to two manners. In the first instance, the exhaust gases received from the collector section 31 are silenced because they must flow through a 180° turn provided by the exhaust inlet device 34 that has its outlet 35 facing forwardly from and in the opposite direction to its inlet section provided by the slip joint 33. In addition, the exhaust gases will be silenced by their expansion from the outlet 35 into the expansion chamber 36. In addition, the exhaust gases are further silenced before they are discharged to the atmosphere through the device now to be described.

The exhaust device 28 has an outlet opening 37 that communicates with a tail pipe silencer section 38 that includes a tuning tube 39 that extends from the expansion chamber 36 into a further expansion chamber 41 formed within the device 38. The exhaust gases flow rearwardly through the tuning tube 39 and open into the expansion chamber 41. These exhaust gases must then flow through a 180° turn into an exhaust pipe 42 that extends through a rear wall 43 of the device 38 from the forward end to its rearward end wherein the exhaust gases will be further silenced. It should be noted that the rear opening 43 is positioned forwardly of the center of rotation of the rear wheel 15 and hence the exhaust system is considerably shorter in length than conventional motorcycle exhaust systems.

It should be readily apparent from the foregoing description that the exhaust system described provides extremely efficient silencing and yet also achieves this within a very compact arrngement and one in which the exhaust gases may be discharged quite far forwardly from the prior art type of constructions. As a result, even though a low center or gravity is achieved, the exhaust system is not so close to the road or operating terrain as to be likely to interfere with the road or terrain during leaning or steering movement of the vehicle 11.

Thus, it should be readily apparent that a very efficient and compact exhaust system is provided that will achieve good silencing and yet provide a compact arrangement has been disclosed. Although an embodiment of the invention has been illustrated and described, it should be noted that this is only a preferred form of the invention and that various changes and variations may be made without departing from the spirit and scope of the invention, as defined by the appended claims.

I claim:

1. In an exhaust system for a vehicle having a frame means, at least one front wheel dirigibly supported by said frame means, at least one rear wheel journaled by said frame means, a combined engine and transmission assembly supported by said frame means and positioned at least in part between said front and rear wheels, said engine and transmission assembly including a combined crankcase change speed transmission lying beneath said engine and extending rearwardly therefrom toward said rear wheel, and said change speed transmission driving said rear wheel from said engine, the improvement comprising a plurality of exhaust pipe extending from said engine rearwardly of said frame means, an exhaust device comprising an expansion chamber having a first portion extending beneath of said engine and transmission and a second portion extending upwardly adjacent to said transmission and forwardly of said rear wheel and inlet means for delivering exhaust gases from said exhaust pipe to said expansion chamber, and outlet means for discharging exhaust gases from said expansion chamber to the atmosphere comprising a second expansion chamber and a tuning tube having an inlet in said first expansion chamber and extending from said first expansion chamber into an outlet in said second expansion chamber and forming the sole means of delivering exhaust gases from said first expansion chamber to said second expansion chamber and an exhaust outlet pipe extending from a position in the second expansion chamber positioned forwardly of the outlet of said tuning tube and extending at its other end into the atmosphere.

2. In an exhaust system as set forth in claim 1 wherein the vehicle comprises a motorcycle.

3. In an exhaust system as set forth in claim 1 wherein the exhaust device inlet means is a collector section having a single outlet and there are a plurality of exhaust pipes extending from the engine and discharging into said collector section.

* * * * *